(12) United States Patent
Noda et al.

(10) Patent No.: US 7,952,634 B2
(45) Date of Patent: May 31, 2011

(54) IMAGE SENSING APPARATUS, IMAGING SYSTEM, AND IMAGE SENSING APPARATUS DRIVING METHOD

(75) Inventors: Tomoyuki Noda, Kawasaki (JP); Tetsuya Itano, Zama (JP); Koichiro Iwata, Ebina (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 12/244,379

(22) Filed: Oct. 2, 2008

(65) Prior Publication Data
US 2009/0109312 A1   Apr. 30, 2009

(30) Foreign Application Priority Data
Oct. 24, 2007   (JP) .................................. 2007-276758

(51) Int. Cl.
*H04N 5/335* (2011.01)
(52) U.S. Cl. ...... 348/304; 348/302; 348/294; 250/208.1
(58) Field of Classification Search .................... 348/304
See application file for complete search history.

(56) References Cited

U.S. PATENT DOCUMENTS

| | | | |
|---|---|---|---|
| 5,698,844 A | 12/1997 | Shinohara et al. | 250/214 R |
| 5,786,588 A | 7/1998 | Takahashi | 250/208.1 |
| 5,955,753 A | 9/1999 | Takahashi | 257/292 |
| 6,147,338 A | 11/2000 | Takahashi | 250/208.1 |
| 6,750,437 B2 | 6/2004 | Yamashita et al. | 250/208.1 |
| 6,914,227 B2 | 7/2005 | Kaifu et al. | 250/208.1 |
| 6,952,228 B2 | 10/2005 | Yoneda et al. | 348/308 |
| 6,960,817 B2 | 11/2005 | Ogura et al. | 257/448 |
| 6,989,863 B1 | 1/2006 | Takahashi | 348/308 |
| 7,030,920 B1 | 4/2006 | Hayashi et al. | 348/302 |
| 7,078,668 B2 | 7/2006 | Yamazaki et al. | 250/208.1 |
| 7,221,400 B2 | 5/2007 | Takahashi et al. | 348/350 |
| 7,280,146 B2 | 10/2007 | Takahashi et al. | 348/340 |
| 7,355,647 B2 | 4/2008 | Takahashi et al. | 348/350 |
| 7,633,540 B2 * | 12/2009 | Totsuka | 348/294 |
| 2005/0270395 A1 | 12/2005 | Yoneda et al. | 348/308 |
| 2008/0054320 A1* | 3/2008 | Solhusvik et al. | 257/292 |

FOREIGN PATENT DOCUMENTS

| | | |
|---|---|---|
| JP | H06-104292 | 4/1994 |
| JP | 2001-045383 | 2/2001 |

* cited by examiner

*Primary Examiner* — Sinh Tran
*Assistant Examiner* — Paul Berardesca
(74) *Attorney, Agent, or Firm* — Fitzpatrick, Cella, Harper & Scinto

(57) ABSTRACT

An image sensing apparatus includes a pixel array including an optical black region and effective pixel region, and a scanning unit which scans the pixel array. The scanning unit includes a first shift register which scans the optical black region by a shift operation, and a second shift register which scans the effective pixel region by a shift operation. The second shift register starts the shift operation during a first period when the first shift register scans the optical black region, and scans a readout region serving as a partial region of the effective pixel region during a second period following the first period.

9 Claims, 9 Drawing Sheets

IMAGE SENSING APPARATUS, IMAGING SYSTEM, AND IMAGE SENSING APPARATUS DRIVING METHOD

BACKGROUND OF THE INVENTION

1. Field of the Invention

The present invention relates to an image sensing apparatus, imaging system, and image sensing apparatus driving method.

2. Description of the Related Art

Previously proposed conventional image sensing apparatus has a pixel array including an optical black region and effective pixel region (see Japanese Patent Laid-Open No. 2001-45383). According to the technique disclosed in Japanese Patent Laid-Open No. 2001-45383, a shift register for scanning the respective rows or columns of the pixel array is formed from a plurality of circuit blocks. A decoder circuit for selecting one of the circuit blocks is arranged on the input side of the shift register. By selecting a circuit block by the decoder circuit, scanning of pixels can start for each pixel block including a plurality of pixels in an effective pixel region.

Recently, image sensing apparatuses such as a video camera and still camera require a high-precision electronic anti-shake (camera shake correction) function. As a technique for implementing the electronic anti-shake function, the present inventor has examined to shift a readout region, which is a partial region of the effective pixel region, in the direction of camera shake in the effective pixel region. To shift the readout region in the effective pixel region in order to implement the electronic anti-shake function, the readout start position of the readout region is changed for each pixel (for each row and each column) in the effective pixel region.

According to the technique in Japanese Patent Laid-Open No. 2001-45383, when the readout start position does not exist at the end of a pixel block, pixels are sequentially skipped from a pixel at the end of a predetermined pixel block to that at the readout start position after the end of scanning the optical black region. This may prolong the period until scanning of the readout region starts for each pixel in the effective pixel region after the end of scanning the optical black region.

If a decoder circuit for selecting one of flip-flops which build the shift register is arranged on the input side of the shift register in order to scan the pixel array, the readout start position of the readout region can be changed for each pixel in the effective pixel region. In this case, however, the size of a circuit for scanning the pixel array may become large, complicating the arrangement of the image sensing apparatus.

SUMMARY OF THE INVENTION

The present invention provides an image sensing apparatus, imaging system, and image sensing apparatus driving method capable of shortening, by a simple arrangement, the period until scanning of the readout region starts for each pixel in the effective pixel region after the end of scanning the optical black region.

According to the first aspect of the present invention, there is provided an image sensing apparatus comprising: a pixel array including an optical black region and an effective pixel region; and a scanning unit which scans the pixel array, the scanning unit including: a first shift register which scans the optical black region by a shift operation; and a second shift register which scans the effective pixel region by a shift operation, wherein the second shift register starts the shift operation during a first period when the first shift register scans the optical black region, and scans a readout region serving as a partial region of the effective pixel region during a second period following the first period.

According to the second aspect of the present invention, there is provided an image sensing apparatus comprising: a pixel array including an optical black region and an effective pixel region; and a scanning unit which scans the pixel array, the scanning unit including: a first shift register which scans the optical black region by a shift operation; and a second shift register which scans the effective pixel region by a shift operation, wherein the second shift register includes a plurality of circuit blocks which receive a second start signal and scan the effective pixel region for each pixel block including a plurality of pixels, and the second shift register selects one of the plurality of circuit blocks and causes the selected circuit block to start the shift operation during a first period when the first shift register scans the optical black region, and causes the selected circuit block to start scanning a readout region serving as a partial region of the effective pixel region during a second period following the first period.

According to the third aspect of the present invention, there is provided an imaging system comprising: an image sensing apparatus defined as the first or second aspect of the present invention; an optical system which forms an image on an image sensing plane of the image sensing apparatus; and a signal processing unit which processes a signal output from the image sensing apparatus to generate image data.

According to the fourth aspect of the present invention, there is provided a method of driving an image sensing apparatus having a pixel array including an optical black region and an effective pixel region, and a scanning unit including a first shift register which receives a first start signal and scans the optical black region by a shift operation of the first start signal, and a second shift register which receives a second start signal and scans the effective pixel region by a shift operation of the second start signal, the method comprising: a first step of causing the first shift register to scan the optical black region during a first period; a second step of causing the second shift register to start the shift operation during the first period; and a third step of causing the second shift register to scan a readout region serving as a partial region of the effective pixel region during a second period following the first period.

According to the fifth aspect of the present invention, there is provided a method of driving an image sensing apparatus having a pixel array including an optical black region and an effective pixel region, and a scanning unit including a first shift register which scans the optical black region by a shift operation, and a second shift register which scans the effective pixel region by a shift operation, the second shift register including a plurality of circuit blocks which receive a second start signal and scan the effective pixel region for each pixel block including a plurality of pixels, the method comprising: a first step of causing the first shift register to scan the optical black region during a first period; a second step of causing the second shift register to select one of the plurality of circuit blocks and cause the selected circuit block to start the shift operation during the first period; and a third step of causing the second shift register to cause the selected circuit block to start scanning a readout region serving as a partial region of the effective pixel region during a second period following the first period.

The present invention can shorten the period until scanning of the readout region starts, for each pixel in the effective pixel region after the end of scanning the optical black region.

Further features of the present invention will become apparent from the following description of exemplary embodiments with reference to the attached drawings.

DESCRIPTION OF THE EMBODIMENTS

Figure 1:
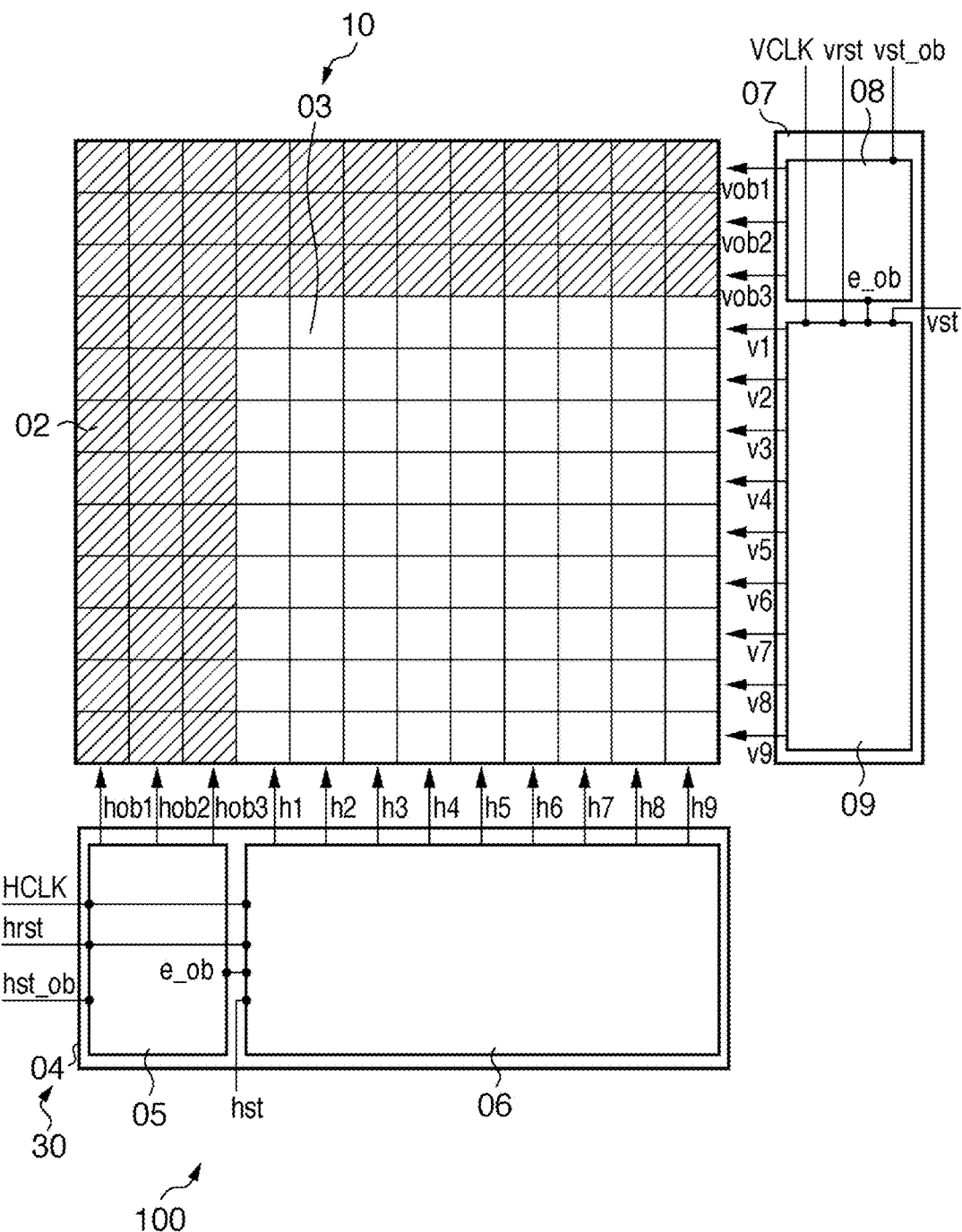
FIG. 1 is a view of the arrangement of an image sensing apparatus 100 according to the first embodiment of the present invention.

The schematic arrangement and schematic operation of an image sensing apparatus 100 according to the first embodiment of the present invention will be described with reference to FIG. 1. FIG. 1 is a view of the arrangement of the image sensing apparatus 100 according to the first embodiment of the present invention.

The image sensing apparatus 100 comprises a pixel array 10 and scanning unit 30.

The pixel array 10 has an optical black (to be referred to as OB hereinafter) region 02 and an effective pixel region 03.

The OB region 02 is shielded from light, and includes a plurality of elements for reading out a reference signal for the black level. The OB region 02 is formed by three columns from the left end or three rows from the upper end of the pixel array 10. The element can be one which has the same structure as that of an effective pixel and is shielded from light. Alternatively, the element is one which does not have a region corresponding to the photoelectric conversion unit (e.g., photodiode) of an effective pixel or has a small volume of a region where the signal charges of the photodiode are stored.

The effective pixel region 03 includes a plurality of pixels which receive light corresponding to the optical image of an object and from which a pixel signal obtained by photoelectrically converting the light is read out. The effective pixel region 03 is a region of 9 rows×9 columns from the lower and right ends of the pixel array 10.

The scanning unit 30 scans the pixel array 10 to drive respective pixels. The scanning unit 30 includes a horizontal shift register unit 04 and vertical shift register unit 07. The horizontal shift register unit 04 horizontally scans the respective columns of the pixel array 10. The vertical shift register unit 07 vertically scans the respective rows of the pixel array 10.

The horizontal shift register unit 04 includes a first horizontal scanning circuit 05 and second horizontal scanning circuit 06. In accordance with horizontal scan signals hob1 to hob3, the first horizontal scanning circuit 05 sequentially scans the respective columns of a region extending in the vertical direction in the OB region 02. The second horizontal scanning circuit 06 sequentially scans the respective columns of the effective pixel region 03 in accordance with horizontal scan signals h1 to h9.

The first horizontal scanning circuit 05 and second horizontal scanning circuit 06 commonly receive a clock signal HCLK and reset signal hrst. The first horizontal scanning circuit 05 and second horizontal scanning circuit 06 receive a first start signal hst_ob and second start signal hst, respectively. The second horizontal scanning circuit 06 receives an end notification signal e_ob from the first horizontal scanning circuit 05. Since two start signals (start pulses) are respectively used for the first horizontal scanning circuit 05 and second horizontal scanning circuit 06, the OB region 02 and effective pixel region 03 can be independently scanned.

The vertical shift register unit 07 includes a first vertical scanning circuit 08 and second vertical scanning circuit 09. In accordance with vertical scan signals vob1 to vob3, the first vertical scanning circuit 08 sequentially scans the respective rows of a region extending in the horizontal direction in the OB region 02. The second vertical scanning circuit 09 sequentially scans the respective rows of the effective pixel region 03 in accordance with vertical scan signals v1 to v9.

The first vertical scanning circuit 08 and second vertical scanning circuit 09 commonly receive a clock signal VCLK and reset signal vrst. The first vertical scanning circuit 08 and second vertical scanning circuit 09 receive a start signal (first start signal) vst_ob and start signal (second start signal) vst, respectively. The second vertical scanning circuit 09 receives an end notification signal e_ob from the first vertical scanning circuit 08. Since two start signals (start pulses) are respectively used for the first vertical scanning circuit 08 and second vertical scanning circuit 09, the OB region 02 and effective pixel region 03 can be independently scanned.

Figure 2:
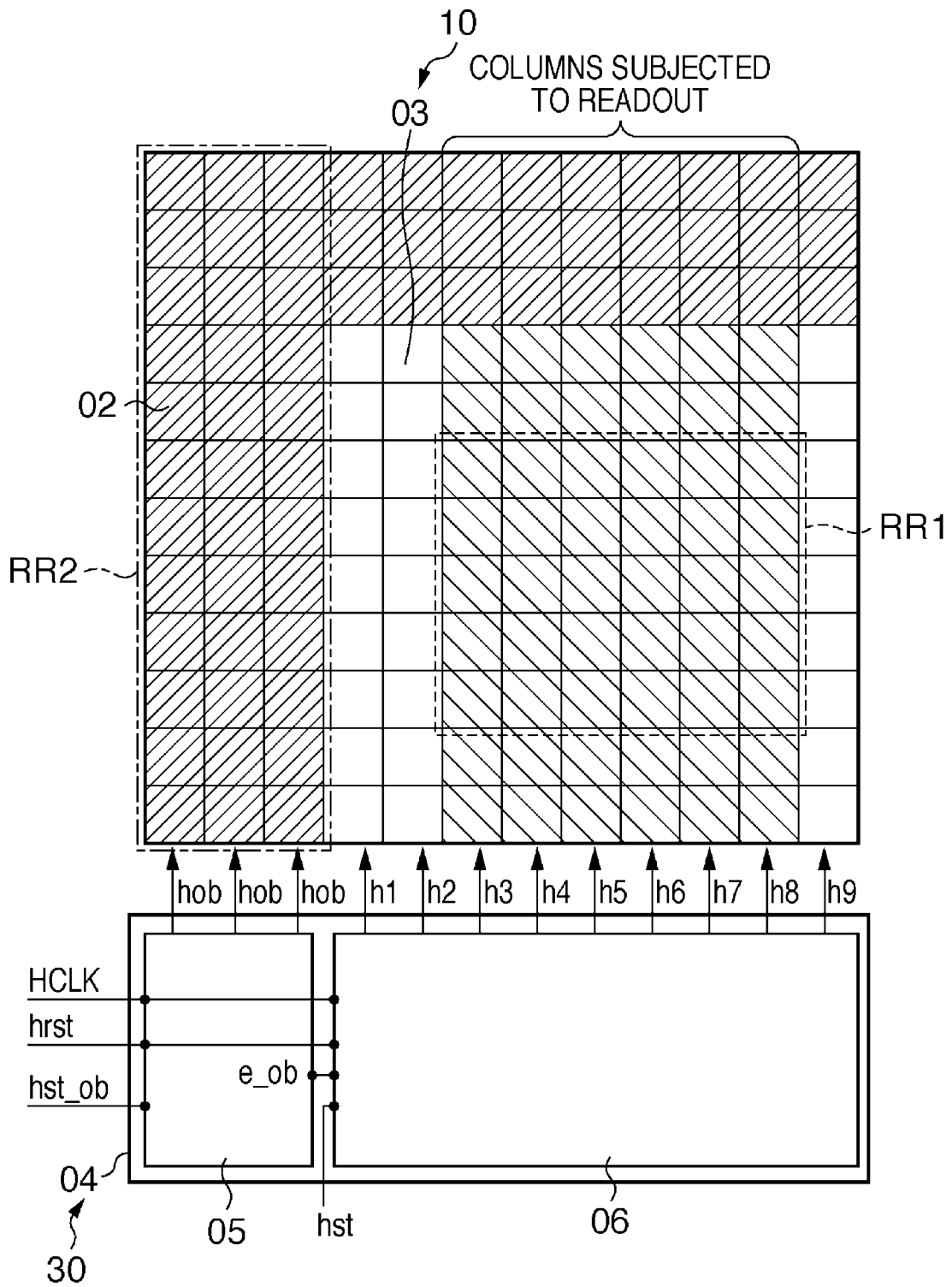
FIG. 2 is a view for explaining a readout region RR1 in an effective pixel region 03.
Figure 3:
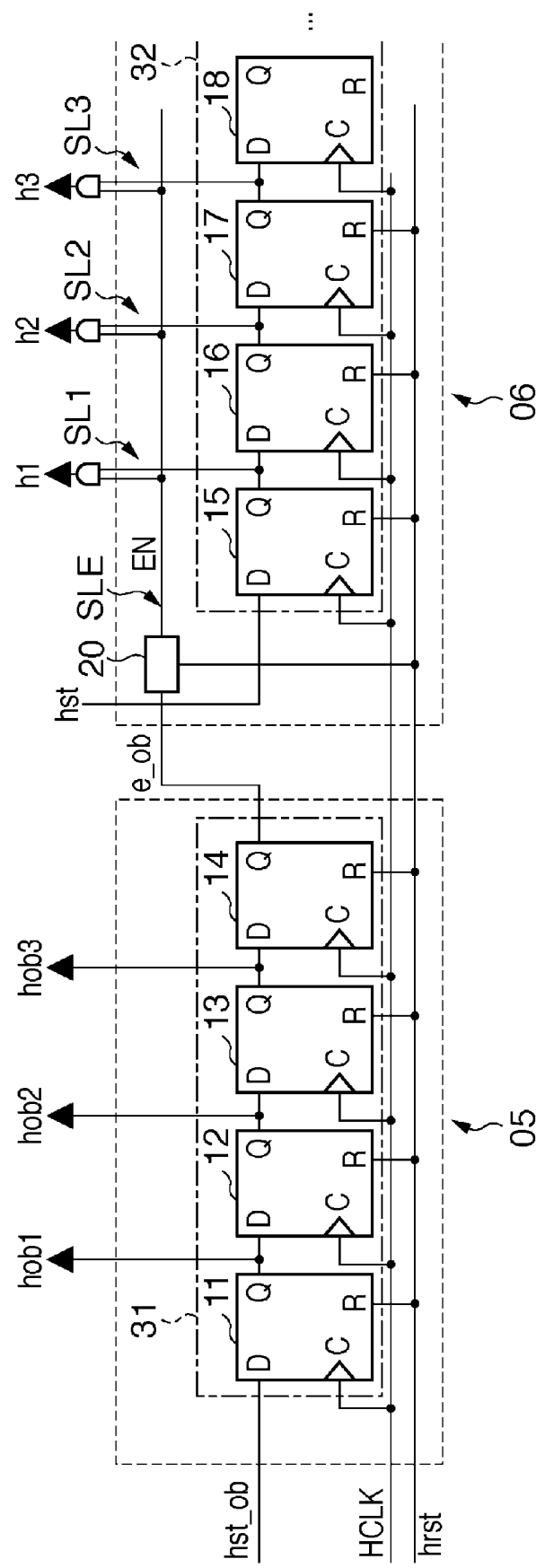
FIG. 3 is a circuit diagram of a horizontal shift register unit.

The arrangement and operation of the scanning unit 30 will be explained with reference to FIGS. 2 and 3. FIG. 2 is a view for explaining a readout region RR1 in the effective pixel region 03. FIG. 3 is a circuit diagram of the horizontal shift register unit. Although the horizontal shift register unit 04 will be mainly explained, the following description also applies to the vertical shift register unit 07.

As described above, the horizontal shift register unit 04 includes the first horizontal scanning circuit 05 and second horizontal scanning circuit 06.

The first horizontal scanning circuit 05 includes a first shift register 31. The first shift register 31 includes a plurality of flip-flops 11 to 14. The first shift register 31 receives the first start signal hst_ob, clock signal HCLK, and reset signal hrst via an input terminal D, clock terminal C, and reset terminal R of each flip-flop, respectively. Upon receiving the reset signal hrst, the first shift register 31 is reset in synchronism with the clock signal HCLK. An output terminal Q of each of the flip-flops 11 to 14 is connected to pixels on each column of a region RR2 extending in the vertical direction in the OB region 02. Upon receiving the first start signal hst_ob, the first shift register 31 shifts the first start signal hst_ob in synchronism with the clock signal HCLK, sequentially scanning the respective columns of the region RR2 extending in the vertical direction in the OB region 02. That is, the first shift register 31 supplies the horizontal scan signals hob1 to hob3 to the respective columns of the pixel array 10.

After the end of scanning the OB region 02, the first shift register 31 outputs the end notification signal e_ob to an enable circuit 20 (to be described later). That is, upon completion of scanning of the OB region 02, the first shift register 31 controls the enable circuit 20 to enable a plurality of signal lines SL1, SL2, SL3, . . . .

The second horizontal scanning circuit 06 includes a second shift register 32, the plurality of signal lines SL1, SL2, SL3, . . . , and the enable circuit 20.

The second shift register 32 includes a plurality of flip-flops (e.g., D flip-flops) 15, 16, 17, 18, . . . . The second shift register 32 receives the second start signal hst, clock signal HCLK, and reset signal hrst via the input terminal D, clock terminal C, and reset terminal R of each flip-flop, respectively. Upon receiving the reset signal hrst, the second shift register 32 is reset in synchronism with the clock signal HCLK.

The plurality of signal lines SL1, SL2, SL3, . . . connect the second shift register 32 to the pixel array 10. That is, the output terminal of each of the flop-flops 15, 16, 17, 18, . . . is connected to pixels on each column of the effective pixel region 03. Note that the second shift register 32 includes flip-flops by the number of columns of the effective pixel region 03, which is not shown in FIG. 3.

Upon receiving the second start signal hst, the second shift register 32 shifts the second start signal hst in synchronism with the clock signal HCLK, sequentially scanning the respective columns of the effective pixel region 03.

Upon receiving the end notification signal e_ob, the enable circuit 20 enables a signal output from the second shift register 32. An output line SLE of the enable circuit 20 and the plurality of signal lines SL1, SL2, SL3, . . . are connected to the respective columns of the pixel array 10 via AND gates.

More specifically, the enable circuit 20 outputs an inactive enable signal EN (e.g., an L-level signal) to the output line SLE until it receives the end notification signal e_ob after it is reset by the reset signal hrst. The enable circuit 20 disables the plurality of signal lines SL1, SL2, SL3, . . . during a first period TP1 (see FIG. 4) when the first shift register 31 scans the OB region 02.

Upon receiving the end notification signal e_ob, the enable circuit 20 outputs an active enable signal EN (e.g., an H-level signal) to the output line SLE. The enable circuit 20 receives the end notification signal e_ob to enable the plurality of signal lines SL1, SL2, SL3, . . . during a second period TP2 (see FIG. 4) following the first period TP1.

As a result, the second shift register 32 starts shifting the second start signal hst during the first period TP1 (starts the shift operation), and scans the readout region RR1 serving as a partial region of the effective pixel region 03 during the second period TP2.

The second shift register 32 may also include a plurality of clocked inverters instead of a plurality of flip-flops.

Figure 4:
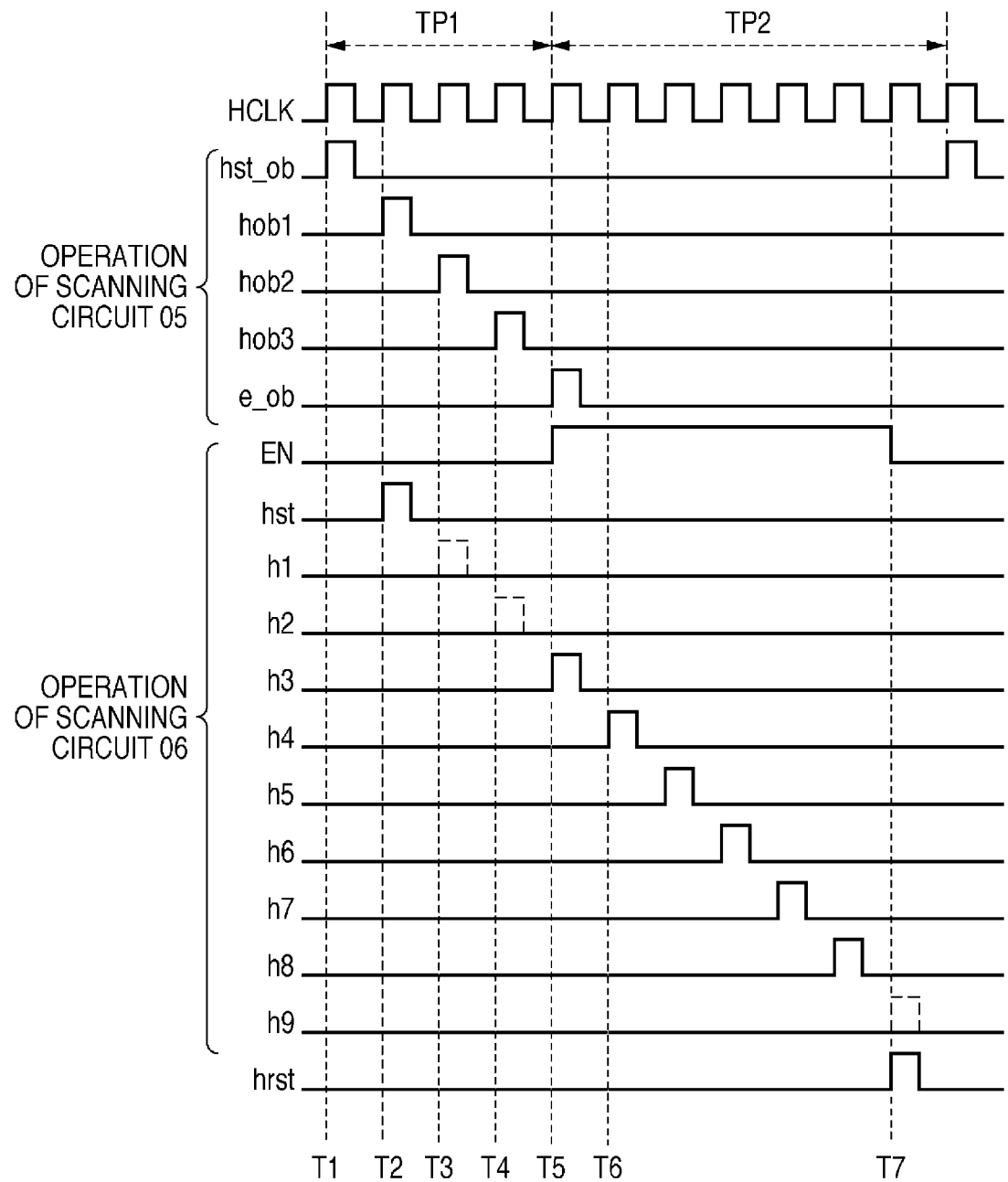
FIG. 4 is a timing chart showing the detailed operation of a scanning unit 30.

The detailed operation of the scanning unit 30 will be explained with reference to FIG. 4. FIG. 4 is a timing chart showing the detailed operation of the scanning unit 30.

In FIG. 4, the first period TP1 is a period when the first shift register 31 scans the OB region 02. The second period TP2 follows the first period TP1.

At timing T1 (first step), the first start signal hst_ob is input externally (from a timing generator 98 to be described later) to the first horizontal scanning circuit 05. Upon receiving the first start signal hst_ob, the first shift register 31 starts scanning the region RR2 extending in the vertical direction in the OB region 02. From this timing, the first period TP1 starts.

At timing T2 (second step), the first shift register 31 shifts the first start signal hst_ob by one stage to activate the horizontal scan signal hob1 corresponding to the first column of the OB region 02. At the same time, the second start signal hst is externally input to the second horizontal scanning circuit 06. Upon receiving the second start signal hst, the second shift register 32 starts shifting the second start signal hst (starts the shift operation). At this time, the enable circuit 20 has not received the end notification signal e_ob yet, and thus keeps the plurality of signal lines SL1, SL2, SL3, . . . disabled.

At timing T3, the first shift register 31 shifts the first start signal hst_ob by one stage to activate the horizontal scan signal hob2 corresponding to the second column of the OB region 02. At the same time, the second shift register 32 shifts the second start signal hst by one stage. At this time, even if an output from the first stage of the second shift register 32 is active (as indicated by a broken line), the enable circuit 20 keeps the plurality of signal lines SL1, SL2, SL3, . . . disabled, so the horizontal scan signal hi corresponding to the first column of the effective pixel region 03 does not become active. That is, the second shift register 32 skips the first column of the effective pixel region 03.

At timing T4, the first shift register 31 shifts the first start signal hst_ob by one stage to activate the horizontal scan signal hob3 corresponding to the third column of the OB region 02. At the same time, the second shift register 32 shifts the second start signal hst by one stage. At this time, even if an output from the second stage of the second shift register 32 is active (as indicated by a broken line), the enable circuit 20 keeps the plurality of signal lines SL1, SL2, SL3, . . . disabled, so the horizontal scan signal h2 corresponding to the second column of the effective pixel region 03 does not become active. That is, the second shift register 32 skips the second column of the effective pixel region 03.

At timing T5 (third step), the first shift register 31 shifts the first start signal hst_ob by one stage to output the end notification signal e_ob to the enable circuit 20. That is, the first shift register 31 controls the enable circuit 20 to enable the plurality of signal lines SL1, SL2, SL3, . . . in response to the end of scanning the OB region 02. Upon receiving the end notification signal e_ob, the enable circuit 20 outputs an active enable signal EN (e.g., an H-level signal) to the output line SLE. The enable circuit 20 enables the plurality of signal lines SL1, SL2, LS3, . . . . At this time, the second shift register 32 shifts the second start signal hst by one stage. At this time, since an output from the third stage of the second shift register 32 is active and the enable circuit 20 has enabled the plurality of signal lines SL1, SL2, SL3, . . . , the horizontal scan signal h3 corresponding to the third column of the effective pixel region 03 becomes active. In other words, the second shift register 32 starts scanning the readout region RR1 in the effective pixel region 03. The first period TP1 ends at this timing, and the second period TP2 starts from this timing.

At timing T6, the second shift register 32 shifts the second start signal hst by one stage. At this time, since an output from the fourth stage of the second shift register 32 is active and the enable circuit 20 has enabled the plurality of signal lines SL1, SL2, SL3, . . . , the horizontal scan signal h4 corresponding to the fourth column of the effective pixel region 03 becomes active. That is, the second shift register 32 scans the readout region RR1 in the effective pixel region 03.

In the same way, the second shift register 32 sequentially activates the horizontal scan signals h5 to h8 to sequentially scan the respective columns (columns subjected to readout) of the readout region RR1.

At timing T7, the first shift register 31, second shift register 32, and enable circuit 20 receive an active reset signal hrst and are reset. Upon the reset, the second shift register 32 ends the shift operation of the second start signal hst. Upon the reset, the enable circuit 20 outputs an inactive enable signal EN (e.g., an L-level signal) to the output line SLE again. The enable circuit 20 disables the plurality of signal lines SL1, SL2, SL3, . . . . That is, the horizontal scan signal h9 corresponding to the ninth column of the effective pixel region 03 becomes inactive, and the second shift register 32 ends scanning the readout region RR1.

As described above, the second shift register 32 receives the second start signal hst in the first period TP1 at a timing (e.g., timing T2 shown in FIG. 4) to start scanning the readout region RR1 from the start of the second period TP2. Even if a decoder circuit for selecting one of flip-flops which build the shift register is not arranged, the period until scanning of the readout region RR1 starts for each pixel in the effective pixel region 03 after the end of scanning the OB region 02 can be shortened. Hence, the period until scanning of the readout region starts for each pixel in the effective pixel region after the end of scanning the optical black region can be shortened by a simple arrangement.

Figure 5:
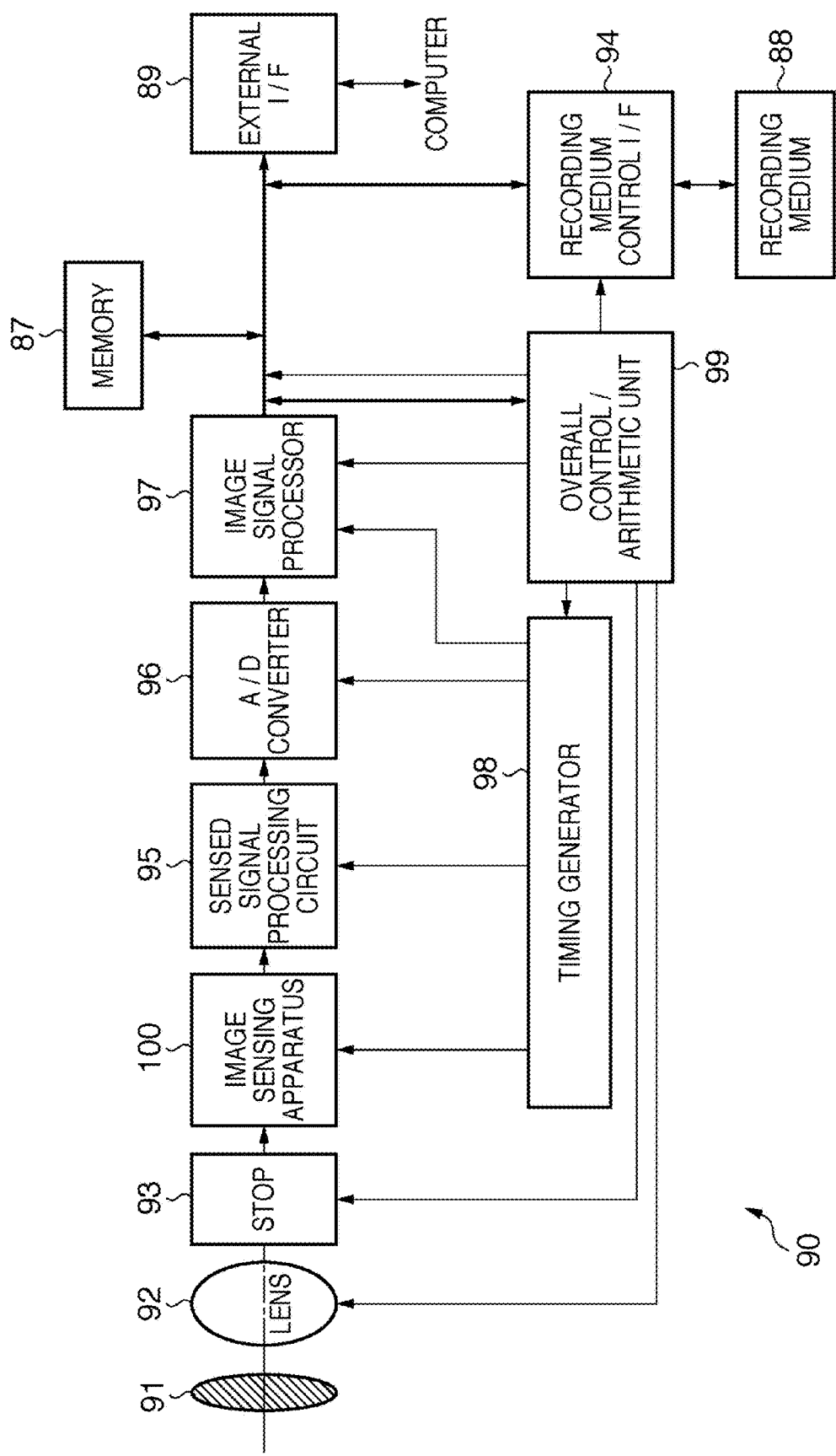
FIG. 5 is a block diagram of an imaging system to which the image sensing apparatus according to the first embodiment is applied.

FIG. 5 shows an example of an imaging system to which the image sensing apparatus according to the present invention is applied.

As shown in FIG. 5, an imaging system 90 mainly comprises an optical system, the image sensing apparatus 100, and a signal processing unit. The optical system mainly comprises a shutter 91, lens 92, and stop 93. The signal processing unit mainly comprises a sensed signal processing circuit 95, an A/D converter 96, an image signal processor 97, a memory 87, an external I/F 89, the timing generator 98, an overall control/arithmetic unit 99, a recording medium 88, and a recording medium control I/F 94. The signal processing unit may not comprise the recording medium 88.

The shutter 91 is arranged in front of the lens 92 on the optical path to control the exposure.

The lens 92 refracts incident light to form an object image on the pixel array (image sensing plane) of the image sensing apparatus 100.

The stop 93 is interposed between the lens 92 and the image sensing apparatus 100 on the optical path, and adjusts the quantity of light guided to the image sensing apparatus 100 after passing through the lens 92.

The image sensing apparatus 100 converts the object image formed on the pixel array 10 into an image signal. The image sensing apparatus 100 reads out the image signal from the pixel array 10, and outputs it.

The sensed signal processing circuit 95 is connected to the image sensing apparatus 100, and processes the image signal output from the image sensing apparatus 100.

The A/D converter 96 is connected to the sensed signal processing circuit 95, and converts the processed image signal (analog signal) output from the sensed signal processing circuit 95 into a digital signal.

The image signal processor 97 is connected to the A/D converter 96, and performs various arithmetic processes such as correction for the image signal (digital signal) output from the A/D converter 96, generating image data. The image signal processor 97 supplies the image data to the memory 87, external I/F 89, overall control/arithmetic unit 99, recording medium control I/F 94, and the like.

The memory 87 is connected to the image signal processor 97, and stores image data output from the image signal processor 97.

The external I/F 89 is connected to the image signal processor 97. The external I/F 89 transfers image data output from the image signal processor 97 to an external device (e.g., a personal computer) via the external I/F 89.

The timing generator 98 is connected to the image sensing apparatus 100, sensed signal processing circuit 95, A/D converter 96, and image signal processor 97. The timing generator 98 supplies timing signals to the image sensing apparatus 100, sensed signal processing circuit 95, A/D converter 96, and image signal processor 97. The image sensing apparatus 100, sensed signal processing circuit 95, A/D converter 96, and image signal processor 97 operate in synchronism with the timing signals.

The overall control/arithmetic unit 99 is connected to the timing generator 98, image signal processor 97, and recording medium control I/F 94, and controls all of them.

The recording medium 88 is detachably connected to the recording medium control I/F 94. The recording medium 88 records image data output from the image signal processor 97 via the recording medium control I/F 94.

In this arrangement, if the image sensing apparatus 100 can obtain a high-quality image signal, a high-quality image (image data) can be provided.

Figure 6:
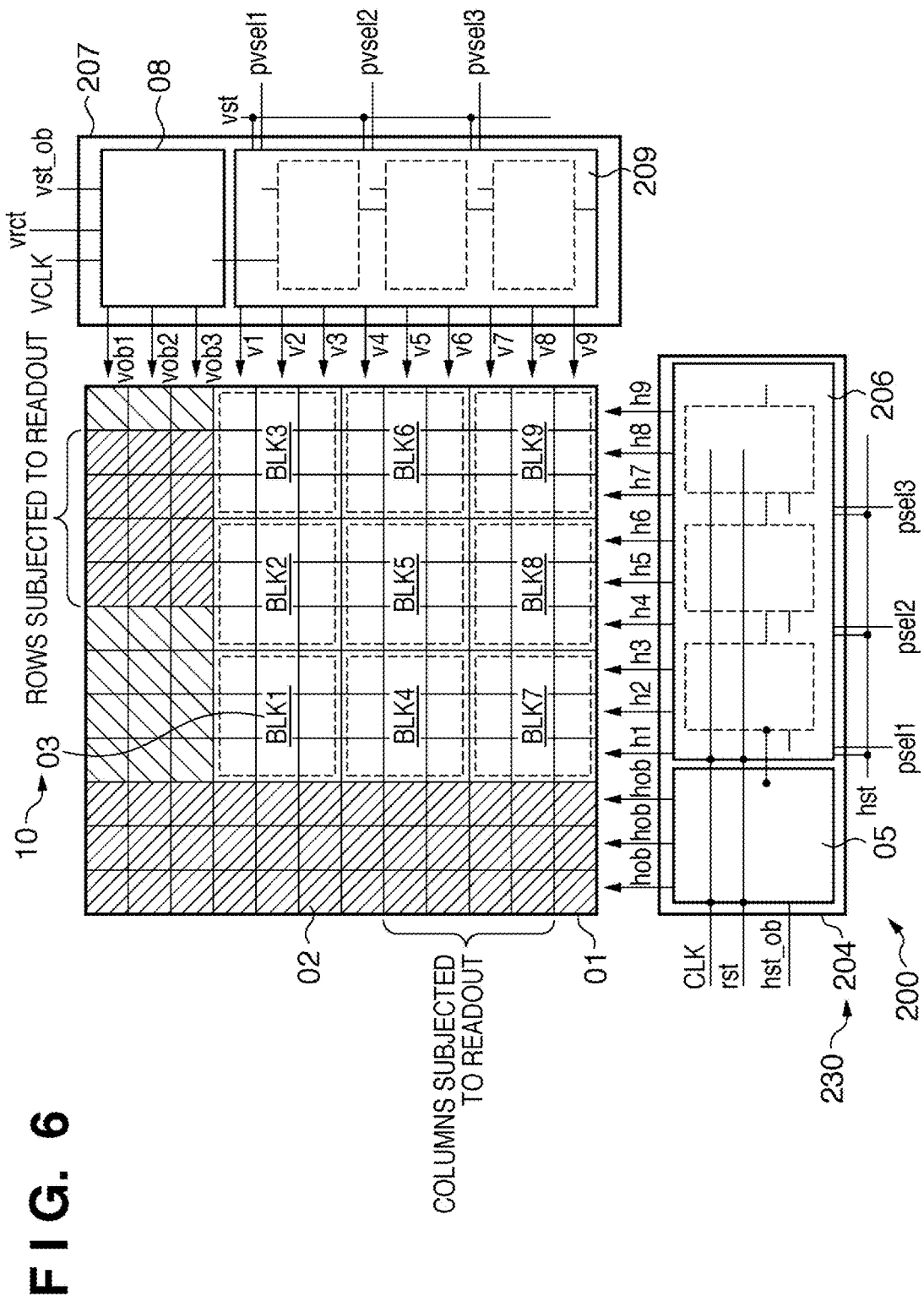
FIG. 6 is a view of the arrangement of an image sensing apparatus 200 according to the second embodiment of the present invention.
Figure 7:
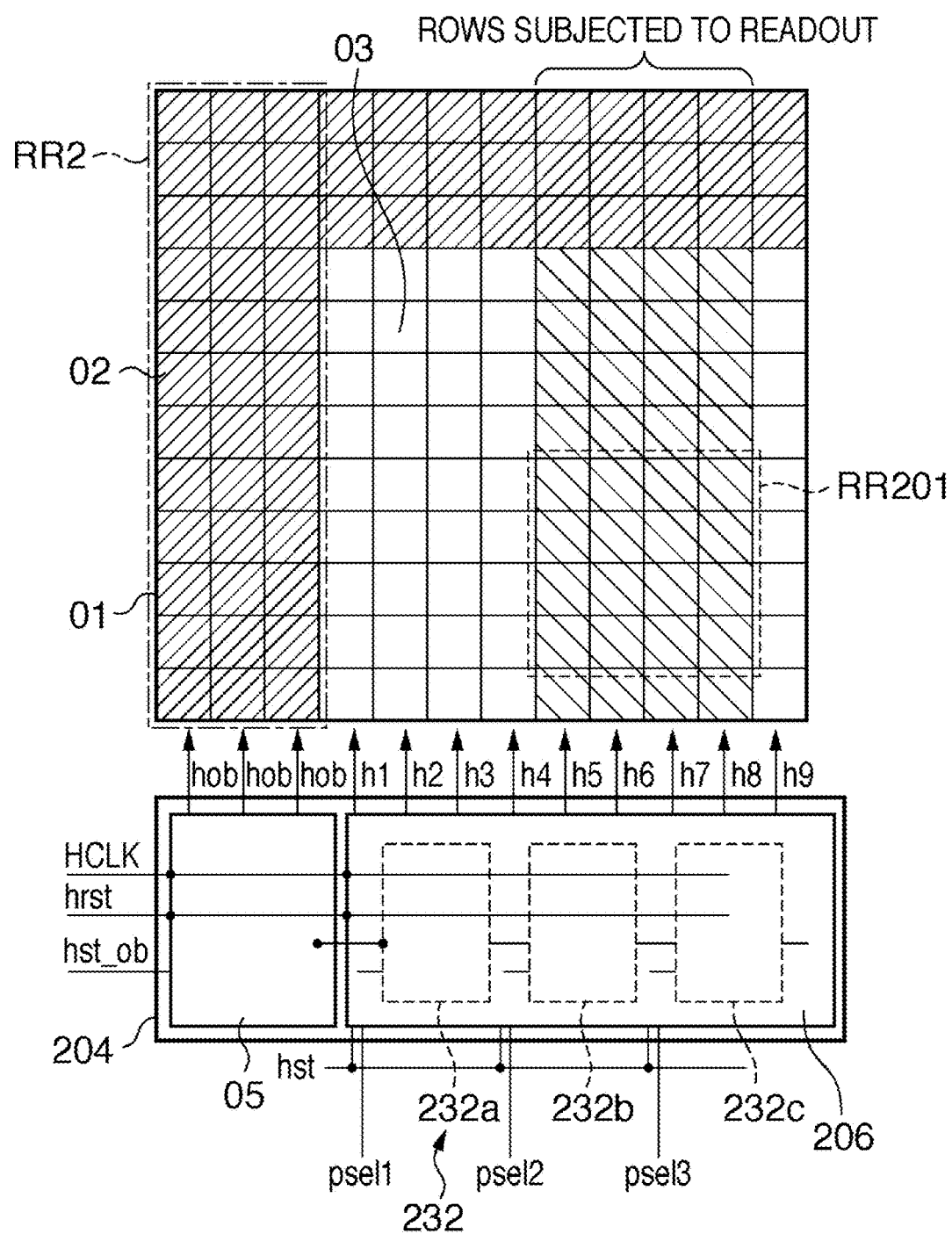
FIG. 7 is a view for explaining a readout region RR201 in an effective pixel region 03.
Figure 8:
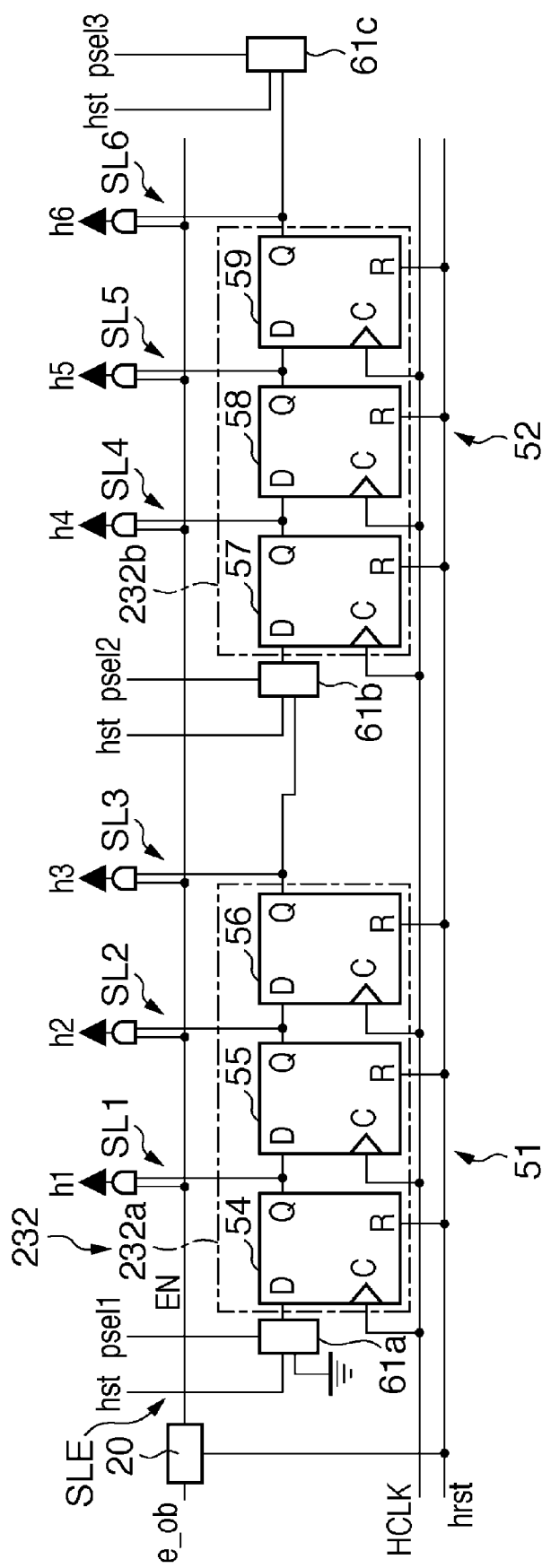
FIG. 8 is a circuit diagram of a horizontal shift register unit.
Figure 9:
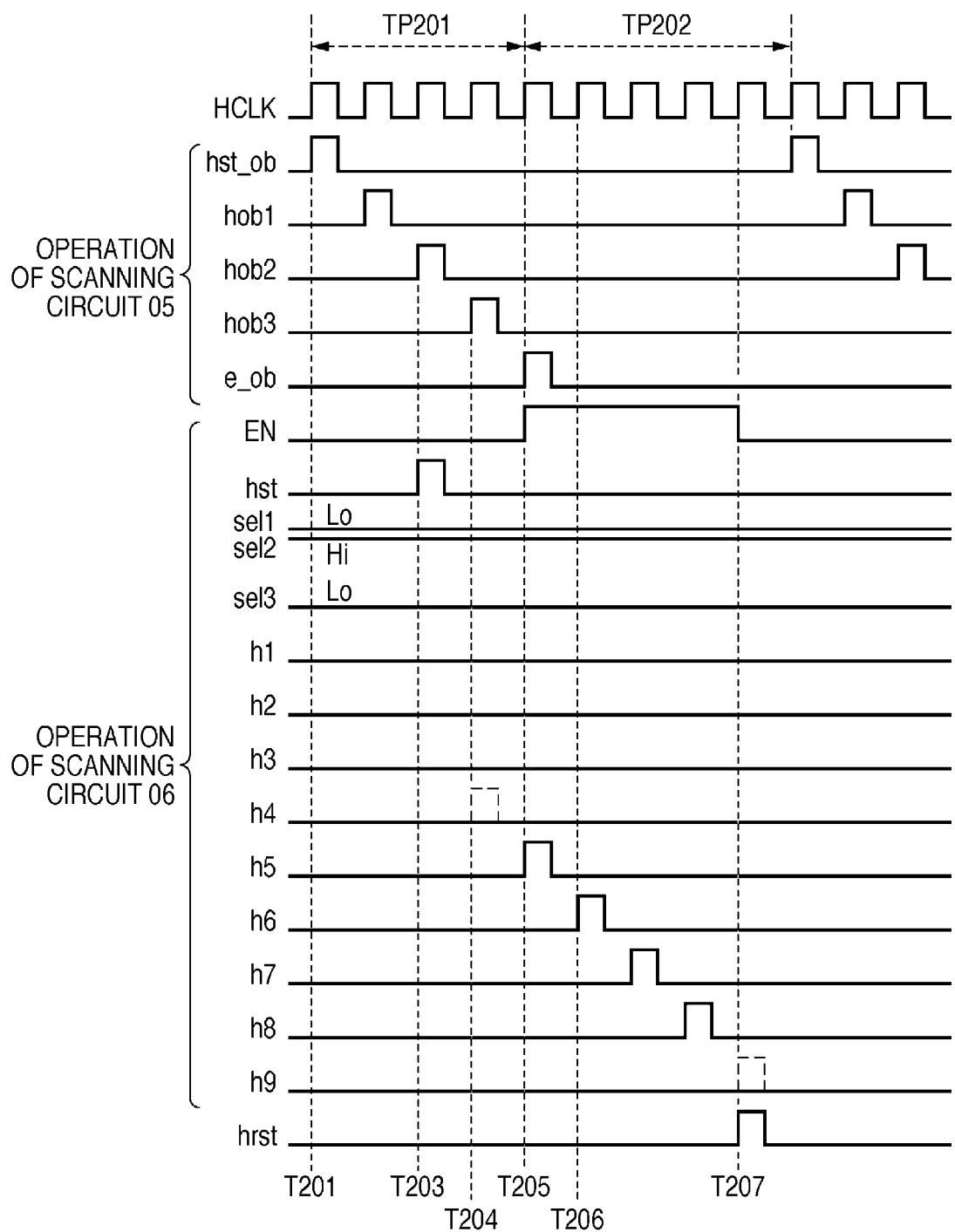
FIG. 9 is a timing chart showing the detailed operation of a scanning unit 230.

An image sensing apparatus 200 according to the second embodiment of the present invention will be described with reference to FIGS. 6 to 9. FIG. 6 is a view of the arrangement of the image sensing apparatus 200 according to the second embodiment of the present invention. FIG. 7 is a view for explaining a readout region RR201 in an effective pixel region 03. FIG. 8 is a circuit diagram of a horizontal shift register unit. FIG. 9 is a timing chart showing the detailed operation of a scanning unit 230. Differences from the first embodiment will be mainly explained, and a description of the same parts will not be repeated.

The image sensing apparatus 200 is different from the image sensing apparatus 100 in the first embodiment in that the image sensing apparatus 200 comprises the scanning unit 230. The scanning unit 230 includes a horizontal shift register unit 204 and vertical shift register unit 207.

The horizontal shift register unit 204 includes a second horizontal scanning circuit 206. In accordance with selection signals psel1, psel2, and psel3, the second horizontal scanning circuit 206 can start scanning the effective pixel region 03 for each of pixel blocks BLK1, BLK4, BLK7, BLK2, BLK5, BLK8, BLK3, BLK6, and BLK9 including a plurality of pixels.

The vertical shift register unit 207 includes a second vertical scanning circuit 209. In accordance with selection signals pvsel1, pvsel2, and pvsel3, the second vertical scanning circuit 209 can start scanning the effective pixel region 03 for each of the pixel blocks BLK1 to BLK3, BLK4 to BLK6, and BLK7 to BLK9 including a plurality of pixels.

Although the horizontal shift register unit 204 will be mainly explained, the following description also applies to the vertical shift register unit 207.

The second horizontal scanning circuit 206 of the horizontal shift register unit 204 includes a second shift register 232, a plurality of signal lines SL1, SL2, SL3, SL4, SL5, SL6, . . . , and a plurality of selection circuits 61a, 61b, and 61c.

The second shift register 232 includes a plurality of circuit blocks 232a, 232b, and 232c which receive the second start signal hst and scan the effective pixel region 03 for each pixel block including a plurality of pixels. The circuit blocks 232a, 232b, and 232c include three flip-flops 54 to 56, three flip-flops 57 to 59, . . . , respectively.

The plurality of selection circuits 61a, 61b, and 61c are respectively arranged on the input sides of the plurality of circuit blocks 232a, 232b, and 232c. When the plurality of selection circuits 61a, 61b, and 61c are selected by the selection signals psel1, psel2, and psel3, they supply the second start signal hst to the subsequent circuit blocks 232a, 232b, and 232c, respectively. When the plurality of selection circuits 61a, 61b, and 61c are not selected by the selection signals psel1, psel2, and psel3, they transfer input signals to the subsequent circuit blocks 232a, 232b, and 232c, respectively.

The detailed operation of the scanning unit 230 is different from that in the first embodiment in the following operation, as shown in FIG. 9.

At timing T201, only the selection circuit 61b receives an active selection signal psel2, whereas the remaining selection circuits 61a and 61c receive inactive selection signals psel1 and psel3. Thus, the second shift register 232 selects the circuit block 232b from a plurality of circuit blocks. From this timing, the first period TP201 starts.

At timing T203, the plurality of selection circuits 61a, 61b, and 61c receive the second start signal hst.

At timing T204, since the selection circuit 61b has received the active selection signal psel2 and has been selected by the selection signal, it supplies the second start signal hst to the subsequent circuit block 232b. The circuit block 232b starts shifting the second start signal hst. That is, the second shift register 232 causes the selected circuit block 232b to start shifting the second start signal hst.

Note that the following operation is the same as that in the first embodiment. Even if an output from the first stage of the selected circuit block 232b is active (as indicated by a broken line), an enable circuit 20 keeps the plurality of signal lines SL1, SL2, SL3, SL4, SL5, SL6, . . . disabled, so the horizontal scan signal h4 corresponding to the fourth column of the effective pixel region 03 does not become active. That is, the second shift register 232 skips the fourth column of the effective pixel region 03.

At timing T205, the second shift register 232 causes the selected circuit block 232b to shift the second start signal hst by one stage. At this time, since an output from the second stage of the selected circuit block 232b is active and the enable circuit 20 has enabled the plurality of signal lines SL1, SL2, SL3, SL4, SL5, SL6, . . . , the horizontal scan signal h5 corresponding to the fifth column of the effective pixel region 03 becomes active. That is, the second shift register 232 causes the selected circuit block 232b to start scanning the readout region RR1. The first period TP201 ends at this timing, and the second period TP202 starts from this timing.

At timing T206, the second shift register 232 causes the selected circuit block 232b to shift the second start signal hst by one stage. At this time, since an output from the third stage of the selected circuit block 232b is active and the enable circuit 20 has enabled the plurality of signal lines SL1, SL2, SL3, SL4, SL5, SL6, . . . , the horizontal scan signal h6 corresponding to the sixth column of the effective pixel region 03 becomes active.

Since the selection circuit 61c receives an inactive selection signal psel3 and is not selected by the selection signal, it transfers the input signal (second start signal hst) to the subsequent circuit block 232c.

At timing T207, the first shift register 31, the circuit blocks 232a to 232c of the second shift register 232, and the enable circuit 20 receive an active reset signal hrst and are reset. Upon the reset, the circuit block 232c ends the shift operation of the second start signal hst. The remaining operation is the same as the operation at timing T7 shown in FIG. 4.

As described above, the selected circuit block 232b receives the second start signal hst in the first period TP201 at a timing (e.g., timing T203 shown in FIG. 9) to start scanning the readout region RR201 from the start of the second period TP202. Even if a decoder circuit for selecting one of flip-flops which build the shift register is not arranged, the period until scanning of the readout region RR201 starts for each pixel in the effective pixel region 03 after the end of scanning the OB region 02 can be shortened. Therefore, the period until scanning of the readout region starts for each pixel in the effective pixel region after the end of scanning the optical black region can be shortened by a simple arrangement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-276758, filed Oct. 24, 2007 which is hereby incorporated by reference herein in its entirety.

What is claimed is:

1. An image sensing apparatus comprising:
   a pixel array including an optical black region and an effective pixel region; and
   a scanning unit which reads signals generated at the pixel array,
   the scanning unit including:
   a first shift register which reads signals of the optical black region by a shift operation for a first period; and
   a second shift register which reads signals of the effective pixel region by a shift operation,
   wherein the second shift register starts a shift operation during the first period when the first shift register reads the signals of the optical black region, and reads signals of a readout region serving as a partial region of the effective pixel region during a second period following the first period, and
   wherein the scanning unit further includes
   a plurality of signal lines which connect the second shift register to the pixel array to read the signals of the effective pixel region, and
   an enable circuit which disables the plurality of signal lines during the first period and enables the plurality of signal lines during the second period, and
   the first shift register controls the enable circuit to enable the plurality of signal lines in response to an end of reading the optical black region.

2. The apparatus according to claim 1, wherein the second shift register starts the shift operation in the first period at a timing to start reading signals of the readout region from the start of the second period.

3. An imaging system comprising:
   an image sensing apparatus defined in claim 1;
   an optical system which forms an image on an image sensing plane of the image sensing apparatus; and
   a signal processing unit which processes a signal output from the image sensing apparatus to generate image data.

4. An image sensing apparatus comprising:
   a pixel array including an optical black region and an effective pixel region; and
   a scanning unit which reads signals generated at the pixel array,
   the scanning unit including:
   a first shift register which reads signals of the optical black region by a shift operation for a first period; and
   a second shift register which reads signals of the effective pixel region by a shift operation,
   wherein the second shift register includes a plurality of circuit blocks which receive a second start signal and read signals of the effective pixel region for each pixel block including a plurality of pixels, and
   the second shift register selects one of the plurality of circuit blocks and causes the selected circuit block to start a shift operation during the first period when the first shift register reads the signals of the optical black region, and causes the selected circuit block to start reading the signals of a readout region serving as a partial region of the effective pixel region during a second period following the first period, and wherein the scanning unit further includes a plurality of signal circuits which are respectively arranged on input sides of the corresponding circuit blocks, and when selected, supply the second start signal to subsequent circuit blocks, and when not selected, transfer input signals to the subsequent circuit blocks, a plurality of signal lines which connect the plurality of circuit blocks to the pixel array to read the signals of the effective pixel region, and an enable circuit which disables the plurality of signal lines during the first period and enables the plurality of signal lines during the second period, and the first shift register controls the enable circuit to enable the plurality of signal lines in response to an end of reading the optical black region.

5. The apparatus according to claim 4, wherein the second shift register causes the selected circuit block to start the shift operation in the first period at a timing to start reading signals of the readout region from the start of the second period.

6. A method of driving an image sensing apparatus having a pixel array including an optical black region and an effective pixel region, and a scanning unit including a first shift register which receives a first start signal and reads signals of the optical black region by a shift operation of the first start signal, and a second shift register which receives a second start signal and reads signals of the effective pixel region by a shift operation of the second start signal, the method comprising:

a first step of causing the first shift register to read signals of the optical black region for a first period;

a second step of causing the second shift register to start a shift operation during the first period; and a third step of causing the second shift register to read signals of a readout region serving as a partial region of the effective pixel region during a second period following the first period wherein in the second step, an enable circuit disables a plurality of signal lines, which connect the second shift register to the pixel array to read the signals of the effective pixel region, during the first period, and in the third step, the enable circuit enables the plurality of signal lines during the second period, and a fourth step of causing the first shift register to control the enable circuit to enable the plurality of signal lines in response to an end of reading the optical black region.

7. The method according to claim 6, wherein in the first step, the second shift register starts the shift operation in the first period at a timing to start reading signals of the readout region from the start of the second period.

8. A method of driving an image sensing apparatus having a pixel array including an optical black region and an effective pixel region, and a scanning unit including a first shift register which reads signals of the optical black region by a shift operation, and a second shift register which reads signals of the effective pixel region by a shift operation, the second shift register including a plurality of circuit blocks which receive a second start signal and read signals of the effective pixel region for each pixel block including a plurality of pixels, the method comprising:

a first step of causing the first shift register to read signals of the optical black region for a first period;

a second step of causing the second shift register to select one of the plurality of circuit blocks and cause the selected circuit block to start a shift operation during the first period; and a third step of causing the second shift register to cause the selected circuit block to start reading signals of a readout region serving as a partial region of the effective pixel region during a second period following the first period wherein in the second step, an enable circuit disables a plurality of signal lines, which connect the plurality of circuit blocks to the pixel array to read the signals of the effective pixel region, during the first period, and in the third step, the enable circuit enables the plurality of signal lines during the second period, and a fourth step of causing the first shift register to control the enable circuit to enable the plurality of signal lines in response to an end of reading the optical black region.

9. The method according to claim 8, wherein in the first step, the second shift register causes the selected circuit block to start the shift operation in the first period at a timing to start reading signals of the readout region from the start of the second period.

* * * * *